(12) United States Patent
Hagiwara et al.

(10) Patent No.: US 10,218,231 B2
(45) Date of Patent: Feb. 26, 2019

(54) MAGNET MATERIAL, PERMANENT MAGNET, ROTARY ELECTRICAL MACHINE, AND VEHICLE

(71) Applicant: KABUSHIKI KAISHA TOSHIBA, Minato-ku, Tokyo (JP)

(72) Inventors: Masaya Hagiwara, Yokohama Kanagawa (JP); Tomohiro Yamashita, Yokohama Kanagawa (JP); Naoyuki Sanada, Kawasaki Kanagawa (JP); Yosuke Horiuchi, Ota Tokyo (JP); Shinya Sakurada, Shinagawa Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 205 days.

(21) Appl. No.: 15/440,057

(22) Filed: Feb. 23, 2017

(65) Prior Publication Data

US 2018/0062455 A1    Mar. 1, 2018

(30) Foreign Application Priority Data

Aug. 24, 2016  (JP) ................................. 2016-163797
Feb. 3, 2017   (JP) ................................. 2017-018622

(51) Int. Cl.
| | | |
|---|---|---|
| *H01F 1/055* | (2006.01) | |
| *H02K 1/02* | (2006.01) | |
| *H02K 7/18* | (2006.01) | |

(52) U.S. Cl.
CPC .............. *H02K 1/02* (2013.01); *H01F 1/055* (2013.01); *H01F 1/0557* (2013.01); *H02K 7/1823* (2013.01); *B60L 2200/26* (2013.01); *B60L 2220/10* (2013.01)

(58) Field of Classification Search
CPC .......... H02K 1/00; H02K 1/02; H02K 7/1823; H01F 1/04; H01F 1/055; H01F 1/0557; H01F 1/0593
See application file for complete search history.

(56) References Cited

U.S. PATENT DOCUMENTS

| | | |
|---|---|---|
| 6,290,782 B1 | 9/2001 | Sakurada et al. |
| 6,419,759 B1 | 7/2002 | Yang et al. |
| 2009/0261774 A1 | 10/2009 | Yuuki et al. |

(Continued)

FOREIGN PATENT DOCUMENTS

| | | |
|---|---|---|
| EP | 0 386 286 A1 | 9/1990 |
| EP | 0 510 578 A2 | 10/1992 |

(Continued)

OTHER PUBLICATIONS

Kuno, et al. "(Sm,Zr)(Fe,Co)11.0-11.5Ti1.0-0.5 compounds as new permanent magnet materials", AIP Advances 6, 025221, 2016.

Suzuki, et al. "A new magnet material with ThMn12 structure: (Nd1—xZrx)(Fe1—yCoy)11+zTi1—zNa (a=0.6-1.3)", Journal of Magnetism and Magnetic Materials 401, 2016, pp. 259-268.

(Continued)

*Primary Examiner* — Burton S Mullins
(74) *Attorney, Agent, or Firm* — Amin, Turocy & Watson LLP

(57) ABSTRACT

An magnetic material is a magnetic material expressed by a composition formula 1: $(R_{1-x}Y_x)_a M_b T_c$, which includes a main phase consisting of a $ThMn_{12}$ type crystal phase. 30 atomic percent or more of the element M in the composition formula 1 is Fe.

15 Claims, 4 Drawing Sheets

(56) References Cited

U.S. PATENT DOCUMENTS

2016/0071635 A1* 3/2016 Sakuma ............ H01F 1/0593
252/62.51 R
2016/0148734 A1 5/2016 Karimi et al.

FOREIGN PATENT DOCUMENTS

| JP | 4-308062 | 10/1992 |
| JP | 4-317304 | 11/1992 |
| JP | 4-322406 | 11/1992 |
| JP | 6-235051 | 8/1994 |
| JP | 6-283316 | 10/1994 |
| JP | 11-340020 | 12/1999 |
| JP | 3741597 | 11/2005 |
| JP | 2008-029148 | 2/2008 |
| JP | 2008-043172 | 2/2008 |
| JP | 2016-058707 | 4/2016 |
| WO | 2016/159612 | 10/2016 |
| WO | 2016/162990 | 10/2016 |

OTHER PUBLICATIONS

Yelsukov, et al. "Mössbauer study of magnetic properties formation in disordered Fe—Al alloys", Journal of Magnetism and Magnetic Materials 115, 1992, pp. 271-280.

Pourroy, et al. "Stabilization of iron-cobalt alloy isomorphous of a—Mn in a metal ferrite composite", Journal of Alloys and Compounds 244, 1996, pp. 90-93.

Extended European Search Report issued by the European Patent Office on Feb. 2, 2018, in connection with European Patent Application No. 17187467.0, 11 pages.

Gabay et al. "Low-cost Ce1—xSmx(Fe, CO, Ti)12 alloys for permanent magnets", AIP Advances, vol. 6, No. 5, Jan. 1, 1901, 6 pages.

Xiao et al., "Crystal structure and spin reorientation transition of Tb1—xYxFe11Mo compounds", J. Phys. D: Appl. Phys. vol. 39 No. 4, Feb. 21, 2006, pp. 615-620.

Chang et al., "Magnetic studies of (Y1—xNdx)(Fe1—y Coy)11.5Mo0.5N alloy powders", Journal of Alloys and Compounds vol. 222, No. 1-2, May 1, 1995, pp. 87-91.

* cited by examiner

MAGNET MATERIAL, PERMANENT MAGNET, ROTARY ELECTRICAL MACHINE, AND VEHICLE

CROSS-REFERENCE TO RELATED APPLICATIONS

This application is based upon and claims the benefit of priority from Japanese Patent Applications No. 2016-163797, filed on Aug. 24, 2016 and No. 2017-018622, filed on Feb. 3, 2017; the entire contents of which are incorporated herein by reference.

FIELD

Embodiments described herein generally relate to a magnetic material, a permanent magnet, a rotary electrical machine, and a vehicle.

BACKGROUND

Permanent magnets are used for products in a wide field including rotary electrical machines such as a motor and a power generator, electrical apparatuses such as a speaker and a measuring device, and vehicles such as an automobile and a railroad vehicle. In recent years, reduction in size of the above-described products has been demanded, and high-performance permanent magnets with high magnetization and high coercive force have been desired.

As examples of high-performance permanent magnets, there can be cited rare-earth magnets such as Sm—Co based magnets and Nd—Fe—B based magnets, for example. In these magnets, Fe and Co contribute to increase in saturation magnetization. Further, these magnets contain rare-earth elements such as Nd and Sm, which brings about a large magnetic anisotropy which is derived from a behavior of 4f electrons of the rare-earth elements in a crystal field. Consequently, it is possible to obtain a large coercive force.

DETAILED DESCRIPTION

Figure 1:
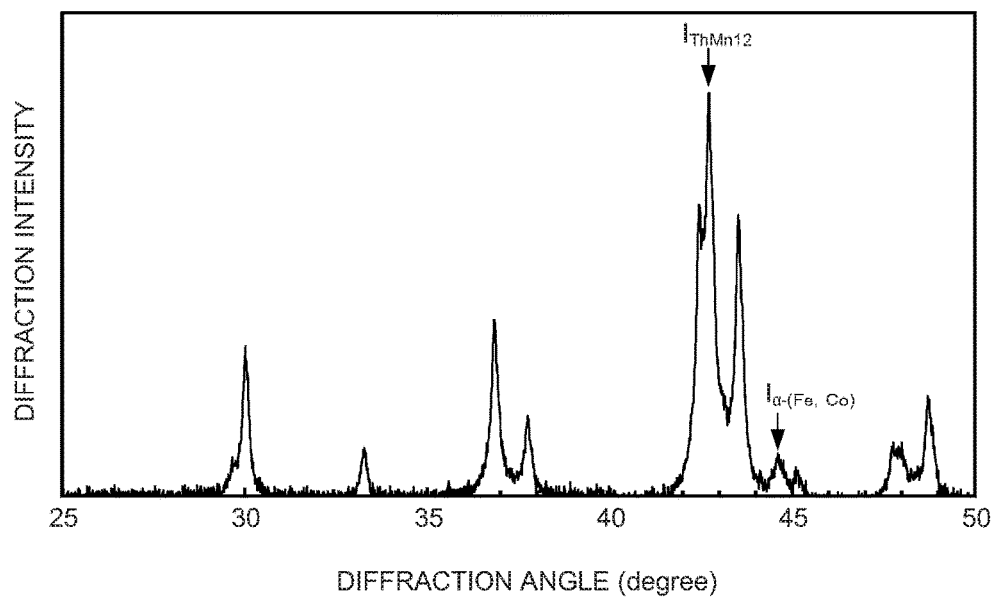
FIG. 1 is a diagram illustrating an X-ray diffraction pattern of a magnetic material.

A problem to be solved by the present invention is to increase saturation magnetization of the magnetic material.

A magnetic material of an embodiment is expressed by a composition formula 1: $(R_{1-x}Y_x)_aM_bT_c$ (in the formula, R represents a rare-earth element of one kind or more, T is at least one element selected from the group consisting of Ti, V, Nb, Ta, Mo, and W, M represents Fe or Fe and Co, x represents a number satisfying $0.01 \leq x \leq 0.8$, a represents a number satisfying $4 \leq a \leq 20$ atomic percent, b represents a number satisfying b=100−a−c atomic percent, and c represents a number satisfying $0 < c < 7$ atomic percent). The magnetic material includes a main phase formed of a $ThMn_{12}$ type crystal phase. 30 atomic percent or more of the element M in the composition formula 1 is Fe.

Hereinafter, embodiments will be described while referring to the drawings. The drawings are schematically illustrated, and, for example, a relationship between a thickness and a plane dimension, a ratio of thicknesses of respective layers, and the like, are sometimes different from actual ones. Further, in the embodiments, substantially the same components are denoted by the same reference numerals, and explanation thereof will be omitted.

(First Embodiment)

A magnetic material of the present embodiment contains a rare-earth element and an element M (M is Fe or Fe and Co). The magnetic material includes a metal structure having a crystal phase as a main phase, and by increasing a concentration of the element M in the main phase, it is possible to improve saturation magnetization. The main phase has the highest volume occupancy ratio among respective crystal phases and an amorphous phase in the magnetic material.

Examples of a crystal phase containing the element M of high concentration include a $ThMn_{12}$ type crystal phase. The $ThMn_{12}$ type crystal phase has a crystal structure of tetragonal system. The magnetic material having the $ThMn_{12}$ type crystal phase as its main phase has a high concentration of the element M to lead precipitation of an α-(Fe, Co) phase. If a hetero-phase such as the α-(Fe, Co) phase precipitates, the concentration of the element M in the main phase reduces, which causes reduction in saturation magnetization of the main phase. Further, the precipitation of the α-(Fe, Co) phase causes reduction in coercive force of the permanent magnet. Accordingly, in the magnetic material of the present embodiment, the reduction in the saturation magnetization is suppressed by reducing the α-(Fe, Co) phase to improve the concentration of the element M in the main phase, while forming a stabilized $ThMn_{12}$ type crystal phase by controlling concentrations of respective elements contained in the main phase.

The magnetic material of the present embodiment has a composition expressed by a composition formula 1: $(R_{1-x}Y_x)_aM_bT_c$ (in the formula, R represents a rare-earth element of one kind or more, T represents at least one element selected from the group consisting of Ti, V, Nb, Ta, Mo, and W, M represents Fe or Fe and Co, x represents a number satisfying $0.01 \leq x \leq 0.8$, a represents a number satisfying $4 \leq a \leq 20$ atomic percent, b represents a number satisfying b=100−a−c atomic percent, and c represents a number satisfying $0 < c < 7$ atomic percent). The magnetic material may also contain inevitable impurities.

Yttrium (Y) is an element effective for stabilization of the $ThMn_{12}$ type crystal phase. Specifically, the element Y can mainly increase stability of the $ThMn_{12}$ type crystal phase through reduction in a crystal lattice caused when it is replaced with the element R in the main phase, and the like. When an addition amount of the element Y is too small, it is not possible to sufficiently achieve an effect of increasing the stability of the $ThMn_{12}$ type crystal phase. When the addition amount of Y is too large, an anisotropic magnetic field of the magnetic material significantly lowers. It is preferable that x is a number satisfying $0.01 \leq x \leq 0.8$, it is more preferable that x is a number satisfying $0.05 \leq x < 0.5$, and it is still more preferable that x is a number satisfying $0.1 \leq x \leq 0.4$.

50 atomic percent or less of the element Y may be replaced with at least one element selected from the group consisting of zirconium (Zr) and hafnium (Hf). The element Zr and the element Hf are elements capable of realizing exhibition of large coercive force in a composition of high Fe concentration. When the element Y is replaced with the element Zr and the element Hf, it is possible to increase the coercive force.

The element R is a rare-earth element, and an element capable of providing large magnetic anisotropy to the magnetic material, and giving high coercive force to a permanent magnet. The element R is, concretely, at least one element selected from the group consisting of lanthanum (La), cerium (Ce), praseodymium (Pr), neodymium (Nd), promethium (Pr), samarium (Sm), europium (Eu), gadolinium (Gd), terbium (Tb), dysprosium (Dy), holmium (Ho), erbium (Er), thulium (Tm), ytterbium (Yb), and lutetium (Lu), and it is preferable to use Sm, in particular. For example, when a plurality of elements including Sm are used as the element R, by setting the Sm concentration to 50 atomic percent or more of all of the elements capable of being applied as the element R, it is possible to increase the performance, for example, the coercive force of the magnetic material.

The concentration a of the element R and the element Y is preferably a number satisfying 4≤a≤20 atomic percent, for example. When the concentration a is less than 4 atomic percent, a large amount of the α-(Fe, Co) phase precipitates, which reduces the coercive force. When the concentration a exceeds 20 atomic percent, a gain boundary phase increases, which reduces the saturation magnetization. The concentration a of the element R and the element Y is more preferably a number satisfying 5≤a≤18 atomic percent, and still more preferably a number satisfying 7≤a≤15 atomic percent.

The element M is Fe or Fe and Co, and is an element responsible for high saturation magnetization of the magnetic material. When compared between Fe and Co, Fe causes higher magnetization, so that Fe is an essential element, and in the magnet of the present embodiment, 30 atomic percent or more of the element M is Fe. By making the element M contain Co, the Curie temperature of the magnetic material increases, resulting in that the reduction in the saturation magnetization in a high-temperature region can be suppressed. Further, by adding a small amount of Co, the saturation magnetization can be further increased, when compared to a case where Fe is solely used. On the other hand, if a Co ratio is increased, the reduction in the anisotropic magnetic field is caused. Further, if the Co ratio is too high, the reduction in the saturation magnetization is also caused. For this reason, by appropriately controlling the ratio between Fe and Co, it is possible to simultaneously realize high saturation magnetization, high anisotropic magnetic field, and high Curie temperature. When M in the composition formula 1 is represented as $(Fe_{1-y}Co_y)$, a desirable value of y is 0.01≤x<0.7, the value is more preferably 0.01≤y<0.5, and is still more preferably 0.01≤y≤0.3. 20 atomic percent or less of the element M may be replaced with at least one element selected from the group consisting of aluminum (Al), silicon (Si), chromium (Cr), manganese (Mn), nickel (Ni), copper (Cu), and gallium (Ga). The above-described elements contribute to growth of crystal grains which form the main phase, for example.

The element T is at least one element selected from the group consisting of titanium (Ti), vanadium (V), niobium (Nb), tantalum (Ta), molybdenum (Mo), and tungsten (W), for example. By adding the element T, it is possible to stabilize the $ThMn_{12}$ type crystal phase. However, by the introduction of the element T, the concentration of the element M reduces, resulting in that the saturation magnetization of the magnetic material easily reduces. In order to increase the concentration of the element M, it is only required to reduce the addition amount of T, but, in such a case, the stability of the $ThMn_{12}$ type crystal phase is lost, and the α-(Fe, Co) phase precipitates, which leads to reduction in the coercive force of the magnetic material. The addition amount c of the element T is preferably a number satisfying 0<c<7 atomic percent. Consequently, it is possible to stabilize the $ThMn_{12}$ type crystal phase while suppressing the precipitation of the α-(Fe, Co) phase. It is more preferable that 50 atomic percent or more of the element T is Ti or Nb. By using Ti or Nb, even if the content of the element T is reduced, it is possible to greatly reduce the precipitation amount of the α-(Fe, Co) phase while stabilizing the $ThMn_{12}$ type crystal phase.

The magnetic material of the present embodiment may further contain an element A. At this time, a composition of the magnetic material is expressed by a composition formula 2: $(R_{1-x}Y_x)_aM_bT_cA_d$ (in the formula, R is a rare-earth element of one kind or more, T is at least one element selected from the group consisting of Ti, V, Nb, Ta, Mo, and W, M is Fe or Fe and Co, A is at least one element selected from the group consisting of N, C, B, H, and P, x is a number satisfying 0.01≤x≤0.8, a is a number satisfying 4≤a≤20 atomic percent, c is a number satisfying 0<c<7 atomic percent, b is a number satisfying b=100−a−c−d atomic percent, and d is a number satisfying 0<d≤18 atomic percent).

The element A is at least one element selected from the group consisting of nitrogen (N), carbon (C), boron (B), hydrogen (H), and phosphorus (P). The element A has a function of entering a crystal lattice of the $ThMn_{12}$ type crystal phase to cause at least one of enlargement of the crystal lattice and change in electronic structure, for example. Consequently, it is possible to change the Curie temperature, the magnetic anisotropy, and the saturation magnetization. The element A does not always have to be added, except for inevitable impurities.

When 50 atomic percent or more of the element R is Sm (when a main component of the element R is Sm), the magnetic anisotropy of the $ThMn_{12}$ type crystal phase changes from a c axis direction to a direction oriented in a plane perpendicular to the c axis due to the entrance of the element A, which reduces the coercive force. For this reason, it is preferable that the element A is not added except for inevitable impurities. On the contrary, when 50 atomic percent or more of the element R is at least one element selected from the group consisting of Ce, Pr, Nd, Tb, and Dy (when the main component of the element R is at least one element selected from the group consisting of Ce, Pr, Nd, Tb, and Dy), the magnetic anisotropy of the $ThMn_{12}$ type crystal phase changes from the direction oriented in the plane perpendicular to the c axis to the c axis direction due to the entrance of the element A, which enables to increase the coercive force. For this reason, the element A is preferably added. When the element A is added, the concentration d of the element A is preferably a number satisfying 0<d≤18 atomic percent. When the concentration d exceeds 18 atomic percent, the stability of the $ThMn_{12}$ type crystal phase reduces. The concentration d of the element A is more preferably a number satisfying 0<d≤14 atomic percent.

Figure 2:
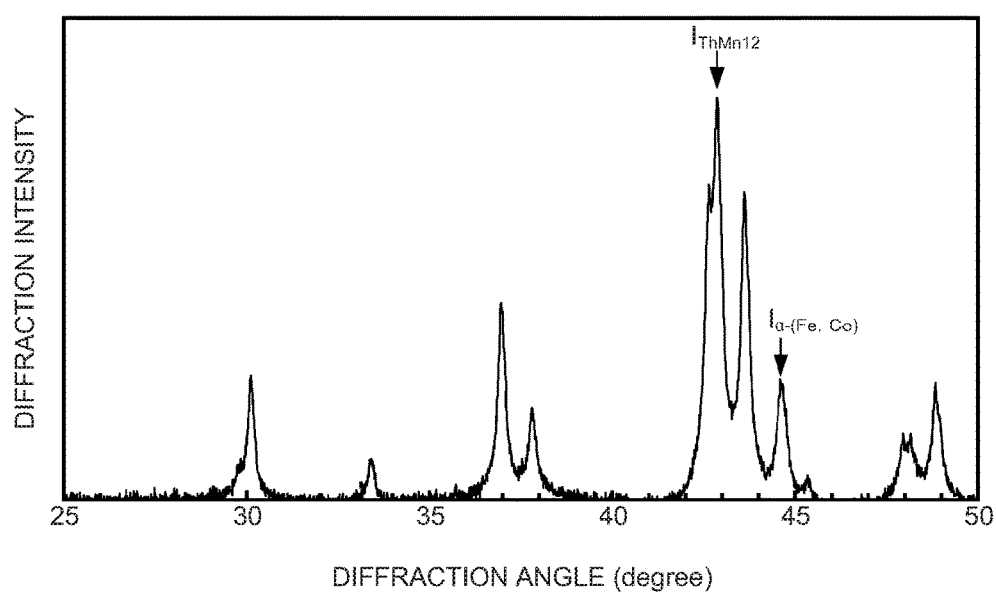
FIG. 2 is a diagram illustrating an X-ray diffraction pattern of a magnetic material.

FIG. 1 is a diagram illustrating an example of an X-ray diffraction pattern of a magnetic material expressed by a composition formula: $(Sm_{0.82}Y_{0.18})_{7.7}(Fe_{0.70}Co_{0.30})_{88.4}Ti_{3.9}$, and FIG. 2 is a diagram illustrating an example of an X-ray diffraction pattern of a magnetic material expressed by a composition formula: $(Sm_{0.68}Zr_{0.32})_{7.8}(Fe_{0.70}Co_{0.30})_{88.2}Ti_{4.0}$. The X-ray diffraction patterns illustrated in FIG. 1 and FIG. 2 can be obtained by performing X-ray diffraction (XRD) measurement on the magnetic materials. From the X-ray diffraction patterns illustrated in FIG. 1 and FIG. 2, it can be understood that each of the magnetic materials includes a metal structure having a ThMn$_{12}$ type crystal phase as its main phase.

A maximum value $I_{\alpha\text{-}(Fe, Co)}$ of a peak intensity brought by an α-(Fe, Co) phase in the X-ray diffraction pattern illustrated in FIG. 1, is smaller than a maximum value $I_{\alpha\text{-}(Fe,Co)}$ of a peak intensity brought by an α-(Fe, Co) phase in the X-ray diffraction pattern illustrated in FIG. 2. This indicates that the magnetic material of the present embodiment has a small precipitation amount of the α-(Fe, Co) phase. In the X-ray diffraction pattern of the magnetic material of the present embodiment, a ratio of a maximum value $I_{\alpha\text{-}(Fe,Co)}$ of a second peak intensity brought by the α-(Fe, Co) phase to a sum of a maximum value $I_{ThMn12}$ of a first peak intensity brought by the ThMn$_{12}$ type crystal phase and the maximum value $I_{\alpha\text{-}(Fe,Co)}$ of the second peak intensity brought by the α-(Fe, Co) phase ($I_{\alpha\text{-}(Fe,Co)}/(I_{\alpha\text{-}(Fe, Co)}+I_{ThMn12})$) is preferably less than 0.20, more preferably less than 0.15, and still more preferably less than 0.10.

In the magnetic material of the present embodiment, as the concentration of the element M in the main phase becomes high, the saturation magnetization of the magnetic material can be increased. The concentration of the element M in the main phase of the magnetic material is preferably 85 atomic percent or more, more preferably 87.4 atomic percent or more, still more preferably 87.6 atomic percent or more, and yet more preferably 88.0 atomic percent or more of the total amount of the elements except for the element A (the element R, the element Y, the element M, and the element T) in the main phase.

In the magnetic material of the present embodiment, by setting the concentration of the element M in the main phase to 87.4 atomic percent or more of the total amount of the elements except for the element A (the element R, the element Y, the element M, and the element T) in the main phase. Therefore, it is possible to provide the magnetic material having the saturation magnetization higher than the conventional saturation magnetization. The saturation magnetization of the entire magnetic material is preferably higher than 1.48 T, and more preferably 1.52 T or higher, for example. Further, the saturation magnetization of the main phase except for the contribution of saturation magnetization of the α-(Fe, Co) phase is preferably higher than 1.41 T, and more preferably 1.50 T or higher, for example. Magnetic physical properties such as the saturation magnetization are calculated by using a vibrating sample magnetometer (VSM), for example.

The composition of the magnetic material is measured through, for example, ICP-AES (Inductively Coupled Plasma-Atomic Emission Spectroscopy), SEM-EDX (Scanning Electron Microscope-Energy Dispersive X-ray Spectroscopy), TEM-EDX (Transmission Electron Microscope-Energy Dispersive X-ray Spectroscopy), or the like. The volume ratios of the respective phases are determined in a comprehensive manner by using both of observation with an electron microscope or an optical microscope, and the X-ray diffraction or the like.

The concentrations of the respective elements of the main phase are measured by using the SEM-EDX, for example. For example, the main phase can be specified by an observation image obtained through the SEM and a mapping image of each element of a measurement sample of the magnetic material obtained through the SEM-EDX.

Next, an example of manufacturing method of the magnetic material of the present embodiment will be described.

First, an alloy containing predetermined elements required for the magnetic material is manufactured. The alloy can be manufactured by using, for example, an arc melting method, a high-frequency melting method, a metal mold casting method, a mechanical alloying method, a mechanical grinding method, a gas atomizing method, a reduction diffusion method, or the like. When the α-(Fe, Co) phase is generated in the manufactured alloy, this leads to reduction in the coercive force of the permanent magnet manufactured from this alloy.

Further, the above-described alloy is melted to be subjected to rapid cooling. This enables to reduce the precipitation amount of the α-(Fe, Co) phase. The melted alloy is subjected to rapid cooling by using a strip cast method, for example. In the strip cast method, the alloy molten metal is tiltingly injected to a chill roll, to thereby manufacture an alloy thin strip. At this time, by controlling a rotation speed of the roll, a cooling rate of the molten metal can be controlled. The roll may be one of either a single-roll type or a twin-roll type.

Heat treatment may also be performed on the above-described alloy thin strip. This enables to homogenize the material. For example, heating is performed at 800 to 1300° C. for 2 to 120 hours. Consequently, it becomes possible to increase the stability of the ThMn$_{12}$ type crystal phase to further improve both properties of the saturation magnetization and the anisotropic magnetic field.

It is also possible to make the element A enter the above-described alloy thin strip. It is preferable that the alloy is pulverized into a powder before the process of making the element A enter the alloy. When the element A is nitrogen, by heating the alloy thin strip for 1 to 100 hours in an atmosphere of nitrogen gas, ammonia gas, or the like of about 0.1 to 100 atmospheric pressure, in a temperature range of 200 to 700° C., it is possible to nitride the alloy thin strip to make the element N enter the alloy thin strip. When the element A is carbon, by heating the alloy thin strip for 1 to 100 hours in an atmosphere of $C_2H_2$, $CH_4$, $C_3H_8$, or Co gas of about 0.1 to 100 atmospheric pressure or thermal decomposition gas of methanol in a temperature range of 300 to 900° C., it is possible to carbonize the alloy thin strip to make the element C enter the alloy thin strip. When the element A is hydrogen, by heating the alloy thin strip for 1 to 100 hours in an atmosphere of hydrogen gas, ammonia gas, or the like of about 0.1 to 100 atmospheric pressure, in a temperature range of 200 to 700° C., it is possible to hydrogenate the alloy thin strip to make the element H enter the alloy thin strip. When the element A is boron, by making a raw material contain boron when manufacturing the alloy, it is possible to make boron to be contained in the alloy thin strip. When the element A is phosphorus, by phosphorizing the alloy thin strip, it is possible to make the element P enter the alloy thin strip.

The magnetic material is manufactured through the above-described process. Further, the permanent magnet is manufactured by using the aforementioned magnetic material. For example, by pulverizing the aforementioned magnetic material and then performing heat treatment such as sintering, a sintered magnet including a sintered compact of the aforementioned magnetic material is manufactured. Further, by pulverizing the aforementioned magnetic material and then performing solidification using a resin or the like, a bond magnet including the aforementioned magnetic material is manufactured.

(Second Embodiment)

The permanent magnet including the sintered compact of the magnetic material of the first embodiment can be used for various motors and power generators. Further, it is possible to use the permanent magnet as a stationary magnet or a variable magnet of a variable magnetic flux motor or a variable magnetic flux power generator. Various motors and power generators are formed by using the permanent magnet of the first embodiment. When the permanent magnet of the first embodiment is applied to a variable magnetic flux motor, techniques disclosed in Japanese Patent Application Laid-open No. 2008-29148 or Japanese Patent Application Laid-open No. 2008-43172 can be applied to a configuration and a drive system of the variable magnetic flux motor.

Figure 3:
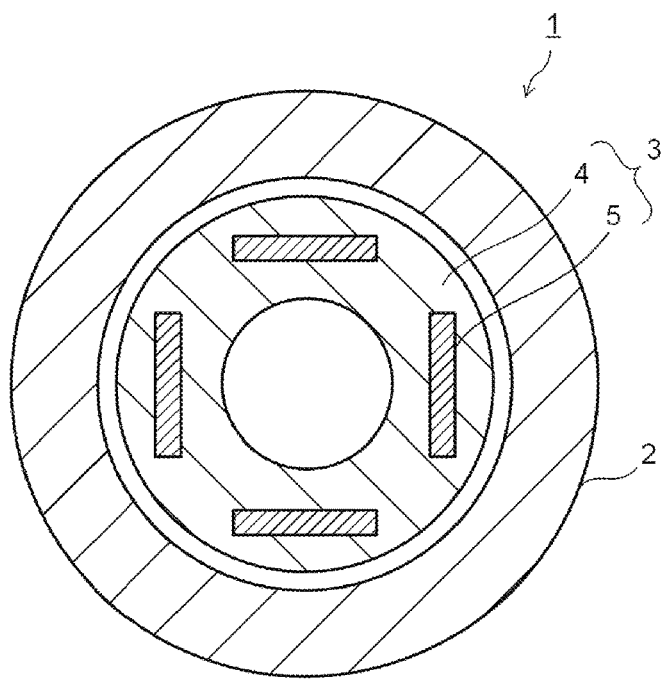
FIG. 3 is a diagram illustrating a motor.

Next, a motor and a power generator including the above-described permanent magnet will be described with reference to the drawings. FIG. 3 is a diagram illustrating a permanent magnet motor. In a permanent magnet motor 1 illustrated in FIG. 3, a rotor 3 is disposed in a stator 2. In an iron core 4 of the rotor 3, permanent magnets 5 being the permanent magnets of the first embodiment are disposed. By using the permanent magnets of the first embodiment, high efficiency, reduction in size, cost reduction and the like of the permanent magnet motor 1 can be achieved based on properties and the like of the respective permanent magnets.

Figure 4:
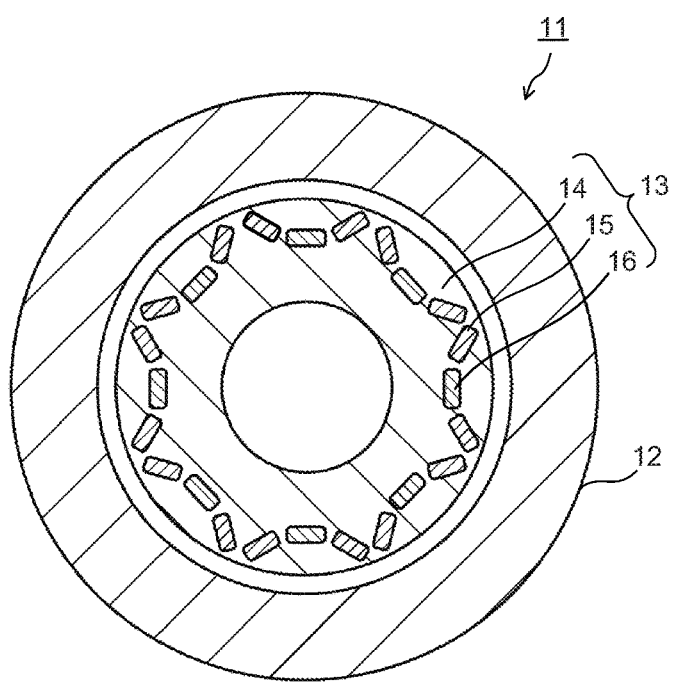
FIG. 4 is a diagram illustrating a motor.

FIG. 4 is a diagram illustrating a variable magnetic flux motor. In a variable magnetic flux motor 11 illustrated in FIG. 4, a rotor 13 is disposed in a stator 12. In an iron core 14 of the rotor 13, the permanent magnet of the first embodiment is disposed as stationary magnets 15 and variable magnets 16. A magnetic flux density (magnetic flux amount) of the variable magnets 16 is variable. A magnetization direction of the variable magnets 16 is orthogonal to a Q-axis direction, and thus the magnets are not affected by a Q-axis current, and can be magnetized by a D-axis current. A magnetization winding (not illustrated) is provided on the rotor 13. It is structured such that by passing a current through the magnetization winding from a magnetizing circuit, a magnetic field thereof operates directly on the variable magnets 16.

According to the permanent magnet of the first embodiment, it is possible to obtain the coercive force suitable for the stationary magnets 15. When the permanent magnet of the first embodiment is applied to the variable magnets 16, it is only required to control the coercive force, for example, to fall within a range of not less than 100 kA/m nor more than 500 kA/m by changing the manufacturing conditions. In the variable magnetic flux motor 11 illustrated in FIG. 4, the permanent magnet of the first embodiment can be used for both of the stationary magnets 15 and the variable magnets 16, but, it is also possible to use the permanent magnet of the first embodiment for either of the magnets. The variable magnetic flux motor 11 is capable of outputting a large torque from a small device size, and thus is preferred for a motor of a hybrid vehicle, electric vehicle, or the like required to have high output power and small size of the motor.

Figure 5:
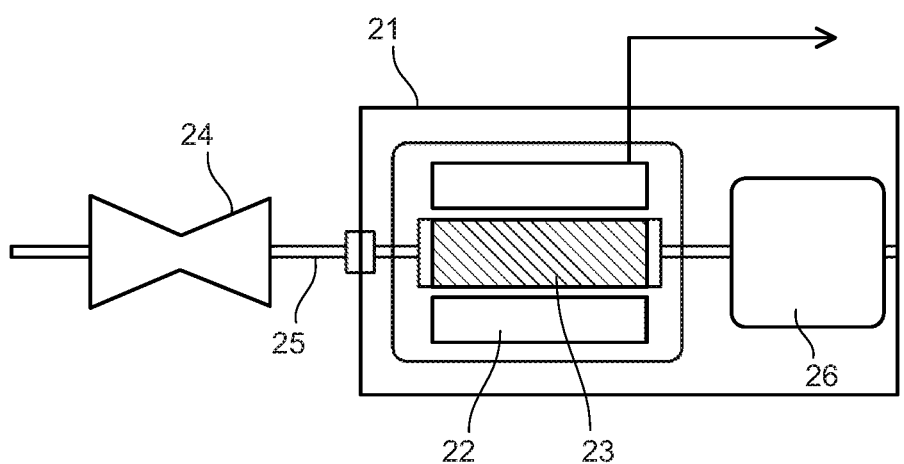
FIG. 5 is a diagram illustrating a power generator.

FIG. 5 illustrates a power generator. A power generator 21 illustrated in FIG. 5 includes a stator 22 using the above-described permanent magnet. A rotor 23 disposed inside the stator 22 is connected via a shaft 25 to a turbine 24 provided at one end of the power generator 21. The turbine 24 is rotated by an externally supplied fluid, for example. Instead of the turbine 24 rotated by the fluid, the shaft 25 can also be rotated by transmitting dynamic rotation such as regenerative energy of an automobile. To the stator 22 and the rotor 23, various publicly-known configurations can be adopted.

The shaft 25 is in contact with a commutator (not illustrated) disposed on the opposite side of the turbine 24 with respect to the rotor 23, and electromotive force generated by rotations of the rotor 23 is increased in voltage to a system voltage and transmitted as output of the power generator 21 via isolated phase buses and a main transformer (not illustrated). The power generator 21 may be either of an ordinary power generator and a variable magnetic flux power generator. A static electricity from the turbine 24 or charges by an axial current accompanying power generation occur on the rotor 23. For this reason, the power generator 21 includes a brush 26 for discharging the charges of the rotor 23.

An use of the above-described permanent magnet to the power generator enable effects such as high efficiency, reduction in size, and cost reduction.

Figure 6:
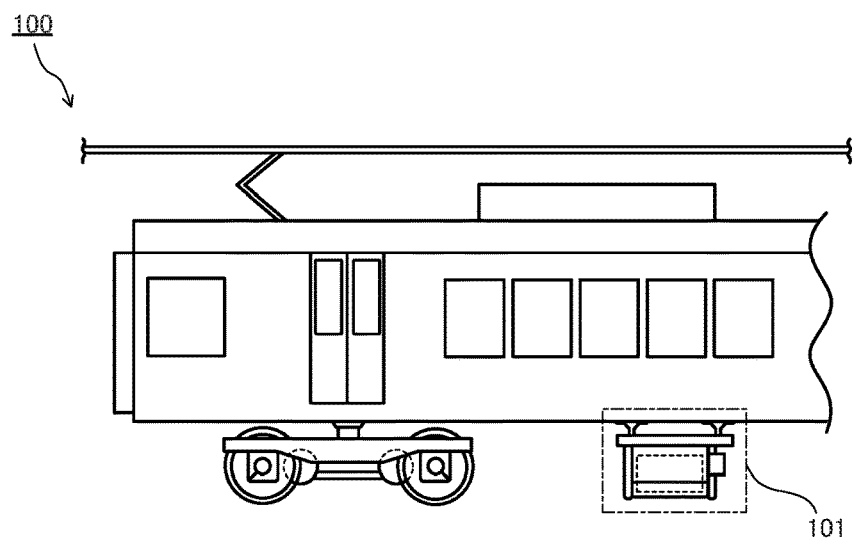
FIG. 6 is a schematic diagram illustrating a configuration example of a vehicle.

The above-described rotary electrical machine may be mounted on a railroad vehicle (one example of vehicle) used in railway traffic, for example. FIG. 6 is a diagram illustrating one example of a railroad vehicle 100 including a rotary electrical machine 101. As the rotary electrical machine 101, the motor in FIG. 3 or FIG. 4, the power generator in FIG. 5 described above, or the like. When the above-described rotary electrical machine is mounted as the rotary electrical machine 101, the rotary electrical machine 101 may be used as an electric motor (motor) which outputs a driving force by utilizing electric power supplied from a power transmission line or electric power supplied from a secondary battery mounted on the railroad vehicle 100, for example, or it may also be used as a power generator (generator) which converts kinetic energy into electric power and supplies the electric power to various loads in the railroad vehicle 100. By utilizing a highly efficient rotary electric machine such as the rotary electrical machine of the embodiment, it is possible to make the railroad vehicle travel while saving energy.

Figure 7:
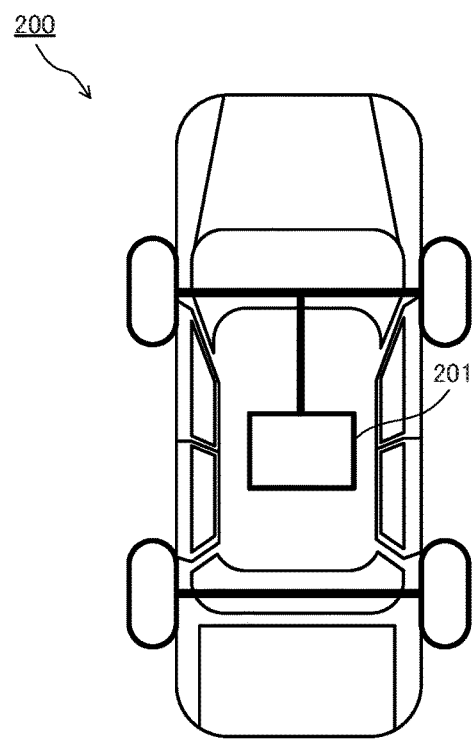
FIG. 7 is a schematic diagram illustrating a configuration example of a vehicle.

The aforementioned rotary electrical machine may also be mounted on an automobile (another example of vehicle) such as a hybrid vehicle or an electric vehicle. FIG. 7 is a diagram illustrating one example of an automobile 200 including a rotary electrical machine 201. As the rotary electrical machine 201, the motor in FIG. 3 or FIG. 4, the power generator in FIG. 5 described above, or the like. When the above-described rotary electrical machine is mounted as the rotary electrical machine 201, the rotary electrical machine 201 may be used as an electric motor which outputs a driving force of the automobile 200, or it may also be used as a power generator which converts kinetic energy at the time of traveling the automobile 200 into electric power.

EXAMPLES

Examples 1 to 30

Appropriate amounts of raw materials were weighed to produce alloys by using the arc melting method. Next, each of the alloys was melted, and the obtained molten metal was subjected to rapid cooling by using the strip cast method, to thereby produce an alloy thin strip. The above-described alloy thin strips were heated for 4 hours at 1100° C. under an Ar atmosphere. Thereafter, compositions of the alloy thin strips after being subjected to the heating were analyzed by using the ICP-AES. The compositions of the magnetic materials obtained by using the ICP-AES are presented in Table 1.

Next, each of the alloy thin strips was pulverized in a mortar to produce an alloy powder. Thereafter, a crystal structure of the aforementioned alloy powder was analyzed through the XRD measurement in which CuKα was set as a radiation source. FIG. 1 illustrates an X-ray diffraction pattern of the magnetic material of an example 1. As a result of the XRD measurement, it was confirmed that the alloy powder includes a metal structure having the $ThMn_{12}$ type crystal phase as its main phase. Further, by calculating $I_{\alpha\text{-}(Fe,Co)}/(I_{\alpha\text{-}(Fe,Co)}+I_{ThMn12})$, a precipitation amount of the α-(Fe, Co) phase was evaluated.

Further, the VSM device was used to evaluate the magnetic physical properties of the magnetic material. A magnetic field of 5.0 T was applied in an in-plane direction of each of the alloy thin strips, and the magnetic field was then swept to −5.0 T, thereby measuring a magnetic field H and magnetization M. By applying a saturation asymptotic law expressed by the following formula (1) with respect to tetragon, to a relationship between the magnetization M and the magnetic field intensity H during when the applied magnetic field was lowered from 5.0 T to 4.5 T, saturation magnetization Ms of the entire magnetic material was calculated.

$$M=Ms(1-H_A^2/15H^2) \quad (Ms \text{ indicates the saturation magnetization, and } H_A \text{ indicates the anisotropic magnetic field.}) \quad (1)$$

Based on the peak intensity brought by the α-(Fe, Co) phase in the X-ray diffraction pattern, the contribution of the α-(Fe, Co) phase with respect to the saturation magnetization was evaluated, and this was subtracted from the saturation magnetization of the entire magnetic material, to thereby determine the saturation magnetization of the main phase. Concretely, a powder sample having no peak intensity brought by the α-(Fe, Co) phase in the X-ray diffraction pattern was produced, and to the power sample, a powder sample having the α-(Fe, Co) phase was added and sufficiently mixed, to thereby produce a plurality of samples. A mass fraction of the powder sample having the α-(Fe, Co) phase in each of the plurality of samples is different within a range of not less than 0 mass % nor more than 21 mass %. When a crystal structure of each of the samples was analyzed through the XRD measurement, a ratio between the mass fraction of the powder sample having the α-(Fe, Co) phase and a maximum value of the peak intensity $I_{\alpha\text{-}(Fe,Co)}/(I_{\alpha\text{-}(Fe,Co)}+I_{ThMn12})$ was confirmed to have a linear relationship. Based on this, a mass fraction of the α-(Fe, Co) phase was determined from the peak intensity of the α-(Fe, Co) phase in the X-ray diffraction pattern, and the mass fraction was converted into the contribution of the α-(Fe, Co) phase to the saturation magnetization.

Next, concentrations of elements in the main phase were measured at five points, respectively, in three observation visual fields through the SEM-EDX measurement, and by calculating simple average at 15 points above, the concentration of the element M in the main phase was calculated. As the measurement point, a point where the α-(Fe, Co) phase does not exist within a radius of 5 μm in a SEM image was selected. In the SEM observation, the observation was performed at an acceleration voltage of 30 kV by using SU8020 manufactured by Hitachi High-Technologies Corporation. Further, in the SEM-EDX measurement, the measurement was conducted by using Octane-super (semiconductor element size: 60 mm²) manufactured by EDAX, with a working distance set to 15 mm and a live time set to 100 seconds. In the calculation of the concentrations of the elements, only the constituent elements of the respective samples were set as calculation targets, in which Lα radiation was applied to Sm, Zr, and Y, and Kα radiation was applied to Fe, Co, and Ti.

Examples 31 to 33

Appropriate amounts of raw materials were weighed to produce alloys by using the arc melting method. Next, each of the alloys was melted, and the obtained molten metal was subjected to rapid cooling by using the strip cast method, to thereby produce an alloy thin strip. The above-described alloy thin strips were heated for 4 hours at 1100° C. under an Ar atmosphere. Thereafter, each of the alloy thin strips was pulverized in a mortar, and the obtained powder was heated for 4 hours at 450° C. in a nitrogen gas atmosphere. After that, compositions of the alloy powders were analyzed by using the ICP-AES. The compositions of the magnetic materials obtained by using the ICP-AES are presented in Table 1.

Next, a crystal structure of the aforementioned alloy powder was analyzed through the XRD measurement in which the CuKα was set as a radiation source. As a result of the XRD measurement, it was confirmed that the alloy powder includes a metal structure having the $ThMn_{12}$ type crystal phase as its main phase. Further, by calculating $I_{\alpha\text{-}(Fe,Co)}/(I_{\alpha\text{-}(Fe,Co)}+I_{ThMn12})$, a precipitation amount of the α-(Fe, Co) phase was evaluated.

Further, the alloy powder was solidified in an acrylic square-shaped cell by using paraffin, and the VSM was used to evaluate the magnetic physical properties of the magnetic materials. The measurement condition and the method of calculating the saturation magnetization are similar to those in the examples 1 to 30.

Next, concentrations of respective elements in the main phase were measured at five points, respectively, in three observation visual fields through the SEM-EDX measurement, and by calculating simple average at 15 points above, the concentration of the element M in the main phase was calculated.

Examples 34, 35

Appropriate amounts of raw materials were weighed to produce alloys by using the arc melting method. Next, each of the alloys was melted, and the obtained molten metal was subjected to rapid cooling by using the strip cast method, to thereby produce an alloy thin strip. The above-described alloy thin strips were heated for 4 hours at 1100° C. under an Ar atmosphere. Thereafter, compositions of the alloy thin strips after being subjected to the heating were analyzed by using the ICP-AES. The compositions of the magnetic materials obtained by using the ICP-AES are presented in Table 1.

Next, each of the alloy thin strips was pulverized in a mortar to produce an alloy powder. Thereafter, a crystal structure of the aforementioned alloy powder was analyzed through the X-ray diffraction measurement in which CuKα was set as a radiation source. As a result of the XRD measurement, it was confirmed that the alloy powder includes a metal structure having the $ThMn_{12}$ type crystal phase as its main phase. Further, by calculating $I_{\alpha\text{-}(Fe,\ Co)}/(I_{\alpha\text{-}(Fe,Co)}+I_{ThMn12})$, a precipitation amount of the α-(Fe, Co) phase was evaluated.

Further, the VSM was used to evaluate the magnetic physical properties of the magnetic materials. The measurement condition and the method of calculating the saturation magnetization are similar to those in the examples 1 to 33.

Next, concentrations of respective elements in the main phase were measured at five points, respectively, in three observation visual fields through the SEM-EDX measurement, and by calculating simple average at 15 points above, the concentration of the element M in the main phase was calculated.

Comparative Examples 1 to 5

Appropriate amounts of raw materials were weighed to produce alloys by using the arc melting method. Next, each of the alloys was heated for 4 hours at 1100° C. under an Ar atmosphere, without being subjected to melting and rapid cooling. Thereafter, compositions of the alloys after being subjected to the heating were analyzed by using the ICP-AES. The compositions of the magnetic materials obtained by using the ICP-AES are presented in Table 1.

Next, each of the alloy thin strips was pulverized in a mortar to produce an alloy powder. Thereafter, a crystal structure of the aforementioned alloy powder was analyzed through the X-ray diffraction measurement in which CuKα was set as a radiation source. FIG. 2 illustrates an X-ray diffraction pattern of the magnetic material of the comparative example 1. As a result of the XRD measurement, it was confirmed that the alloy powder includes a metal structure having the $ThMn_{12}$ type crystal phase as its main phase. Further, by calculating $I_{\alpha-(Fe, Co)}/(I_{\alpha-(Fe,Co)}+I_{ThMn12})$, a precipitation amount of the α-(Fe, Co) phase was evaluated.

Further, the VSM was used to evaluate the magnetic physical properties of the magnetic materials. The measurement condition and the method of calculating the saturation magnetization are similar to those in the examples 1 to 35.

Next, concentrations of respective elements in the main phase were measured at five points, respectively, in three observation visual fields through the SEM-EDX measurement, and by calculating simple average at 15 points above, the concentration of the element M in the main phase was calculated.

Table 1 shows that 30 atomic percent or more of the element M in each of the magnetic materials of examples 1 to 33 is Fe, and each of the materials has high saturation magnetization. The concentration of the element M in the main phase in each of the magnetic materials of examples 1 to 27 and 31 to 33 is 87.4 atomic percent or more of the total amount of the element R, the element Y, the element M, and the element T, and thereby each of the materials has higher saturation magnetization. When the element M in each of the magnetic materials of examples 21 to 26, 28, 29, and 33 is expressed by $Fe_{1-y}Co_y$, the value of the y is 0.01 or more and 0.3 or less, each of the materials has higher anisotropic magnetic field. Further, $I_{\alpha-(Fe,Co)}/(I_{\alpha-(Fe,Co)}+I_{ThMn12})$ of the magnetic material in each of the examples 1 to 27 and 31 to 33 is less than 0.15. Furthermore, the saturation magnetization of the main phase of the magnetic material in each of the examples 1 to 27 and 31 to 33 is 1.48 T or more, and the anisotropic magnetic field in each of the examples 1 to 35 is 3 MA/m or more.

In contract, less than 30 atomic percent of the element M in each of the magnetic materials of comparative examples 5 is Fe, and each of the materials has low saturation magnetization and low anisotropic magnetic field. The concentration of the element Y in each of the comparative examples 1 to 4 is outside the scope of the inventions, and

TABLE 1

| | Composition of Magnet Material | Saturation Magnetization of Magnet Material (T) | Concentration of Element M in Main Phase (atomic percent) | $I_{\alpha-(Fe, Co)}/(I_{\alpha(Fe, Co)} + I_{ThMn12})$ | Saturation Magnetization of Main Phase (T) | Anisotropic Magnetic Field of Magnet Material (MA/m) |
|---|---|---|---|---|---|---|
| Example 1 | $(Sm_{0.82}Y_{0.18})_{7.7}(Fe_{0.70}Co_{0.30})_{88.4}Ti_{3.9}$ | 1.55 | 87.8 | 0.099 | 1.50 | 6.0 |
| Example 2 | $(Sm_{0.71}Y_{0.29})_{7.5}(Fe_{0.70}Co_{0.30})_{88.9}Nb_{3.6}$ | 1.54 | 88.0 | 0.106 | 1.51 | 5.5 |
| Example 3 | $(Sm_{0.72}Y_{0.28})_{7.5}Fe_{88.5}Ti_{4.0}$ | 1.53 | 87.8 | 0.131 | 1.49 | 7.8 |
| Example 4 | $(Sm_{0.71}Y_{0.29})_{7.5}Fe_{88.9}Ti_{3.6}$ | 1.52 | 88.0 | 0.143 | 1.48 | 7.6 |
| Example 5 | $(Sm_{0.71}Y_{0.29})_{7.5}(Fe_{0.70}Co_{0.30})_{88.9}V_{3.6}$ | 1.53 | 87.6 | 0.132 | 1.49 | 5.2 |
| Example 6 | $(Sm_{0.71}Y_{0.29})_{7.5}(Fe_{0.70}Co_{0.30})_{88.9}Ta_{3.6}$ | 1.52 | 87.7 | 0.136 | 1.48 | 5.4 |
| Example 7 | $(Sm_{0.71}Y_{0.29})_{7.5}(Fe_{0.70}Co_{0.30})_{88.9}Mo_{3.6}$ | 1.53 | 87.6 | 0.140 | 1.49 | 5.1 |
| Example 8 | $(Sm_{0.71}Y_{0.29})_{7.5}(Fe_{0.70}Co_{0.30})_{88.9}W_{3.6}$ | 1.52 | 87.6 | 0.139 | 1.48 | 5.3 |
| Example 9 | $(Sm_{0.72}Y_{0.14}Zr_{0.14})_{7.5}(Fe_{0.70}Co_{0.30})_{88.5}Ti_{4.0}$ | 1.52 | 87.6 | 0.137 | 1.48 | 5.4 |
| Example 10 | $(Sm_{0.71}Y_{0.19}Zr_{0.10})_{7.5}(Fe_{0.70}Co_{0.30})_{88.9}Nb_{3.6}$ | 1.53 | 87.7 | 0.132 | 1.49 | 5.4 |
| Example 11 | $(Sm_{0.71}Y_{0.19}Hf_{0.10})_{7.5}(Fe_{0.70}Co_{0.30})Nb_{3.6}$ | 1.52 | 87.6 | 0.129 | 1.48 | 5.2 |
| Example 12 | $(Sm_{0.71}Y_{0.19}Zr_{0.06}Hf_{0.04})_{7.5}(Fe_{0.70}Co_{0.30})_{88.9}Nb_{3.6}$ | 1.52 | 87.7 | 0.136 | 1.48 | 5.1 |
| Example 13 | $(Sm_{0.72}Y_{0.28})_{7.5}(Fe_{0.70}Co_{0.30})_{88.5}Nb_{2.5}Ti_{1.5}$ | 1.54 | 87.6 | 0.109 | 1.51 | 5.4 |
| Example 14 | $(Sm_{0.71}Y_{0.29})_{7.5}(Fe_{0.70}Co_{0.29}Al_{0.01})_{88.9}Nb_{3.6}$ | 1.53 | 87.6 | 0.106 | 1.50 | 5.0 |
| Example 15 | $(Sm_{0.71}Y_{0.29})_{7.5}(Fe_{0.70}Co_{0.29}Si_{0.01})_{88.9}Nb_{3.6}$ | 1.54 | 87.7 | 0.107 | 1.51 | 4.9 |
| Example 16 | $(Sm_{0.71}Y_{0.29})_{7.5}(Fe_{0.70}Co_{0.29}Cr_{0.01})_{88.9}Nb_{3.6}$ | 1.54 | 87.6 | 0.105 | 1.51 | 5.0 |
| Example 17 | $(Sm_{0.71}Y_{0.29})_{7.5}(Fe_{0.70}Co_{0.29}Mn_{0.01})_{88.9}Nb_{3.6}$ | 1.53 | 87.8 | 0.106 | 1.50 | 5.0 |
| Example 18 | $(Sm_{0.71}Y_{0.29})_{7.5}(Fe_{0.70}Co_{0.29}Ni_{0.01})_{88.9}Nb_{3.6}$ | 1.54 | 87.6 | 0.107 | 1.51 | 4.8 |
| Example 19 | $(Sm_{0.71}Y_{0.29})_{7.5}(Fe_{0.70}Co_{0.29}Cu_{0.01})_{88.9}Nb_{3.6}$ | 1.53 | 87.9 | 0.108 | 1.50 | 4.9 |
| Example 20 | $(Sm_{0.71}Y_{0.29})_{7.5}(Fe_{0.70}Co_{0.29}Ga_{0.01})_{88.9}Nb_{3.6}$ | 1.54 | 87.6 | 0.106 | 1.51 | 5.0 |
| Example 21 | $(Sm_{0.75}Y_{0.25})_{7.6}(Fe_{0.80}Co_{0.20})_{88.5}Ti_{3.9}$ | 1.55 | 88.3 | 0.066 | 1.53 | 6.7 |
| Example 22 | $(Sm_{0.83}Y_{0.17})_{7.6}(Fe_{0.82}Co_{0.18})_{88.8}Nb_{3.6}$ | 1.52 | 87.5 | 0.131 | 1.48 | 7.5 |
| Example 23 | $(Sm_{0.81}Y_{0.19})_{7.5}(Fe_{0.85}Co_{0.15})_{88.5}Ti_{4.0}$ | 1.52 | 88.1 | 0.074 | 1.50 | 7.4 |
| Example 24 | $(Sm_{0.71}Y_{0.29})_{7.5}(Fe_{0.90}Co_{0.10})_{88.5}Ti_{4.0}$ | 1.50 | 87.9 | 0.077 | 1.48 | 7.4 |
| Example 25 | $(Sm_{0.85}Y_{0.15})_{7.5}(Fe_{0.79}Co_{0.21})_{88.5}Ti_{4.0}$ | 1.55 | 88.2 | 0.072 | 1.53 | 7.4 |
| Example 26 | $(Sm_{0.58}Y_{0.42})_{7.5}(Fe_{0.80}Co_{0.20})_{88.6}Ti_{3.9}$ | 1.52 | 88.0 | 0.071 | 1.50 | 6.0 |
| Example 27 | $(Sm_{0.71}Y_{0.29})_{7.7}(Fe_{0.60}Co_{0.40})_{88.7}Ti_{3.6}$ | 1.54 | 87.6 | 0.108 | 1.51 | 4.5 |
| Example 28 | $(Sm_{0.75}Y_{0.25})_{7.8}(Fe_{0.80}Co_{0.20})_{89.2}Ti_{3.0}$ | 1.52 | 86.8 | 0.197 | 1.46 | 6.3 |
| Example 29 | $(Sm_{0.93}Y_{0.07})_{7.7}(Fe_{0.85}Co_{0.15})_{88.7}Ti_{3.6}$ | 1.50 | 86.3 | 0.201 | 1.44 | 7.5 |
| Example 30 | $(Sm_{0.90}Y_{0.10})_{7.7}(Fe_{0.48}Co_{0.52})_{88.7}Ti_{3.6}$ | 1.49 | 86.7 | 0.199 | 1.43 | 3.5 |
| Example 31 | $(Nd_{0.72}Y_{0.28})_{7.2}(Fe_{0.70}Co_{0.30})_{81.9}Ti_{3.8}N_{7.1}$ | 1.52 | 87.7 | 0.138 | 1.48 | 6.5 |
| Example 32 | $(Nd_{0.72}Y_{0.28})_{7.5}(Fe_{0.70}Co_{0.30})_{82.2}Nb_{3.5}N_{6.8}$ | 1.53 | 87.8 | 0.123 | 1.49 | 6.7 |
| Example 33 | $(Sm_{0.65}Nd_{0.1}Y_{0.25})_{7.4}(Fe_{0.79}Co_{0.21})_{82.4}Nb_{3.9}N_{6.3}$ | 1.52 | 87.7 | 0.112 | 1.49 | 6.2 |
| Example 34 | $(Sm_{0.72}Y_{0.28})_{7.5}(Fe_{0.70}Co_{0.30})_{88.5}Ti_{4.0}$ | 1.47 | 85.9 | 0.213 | 1.40 | 5.4 |
| Example 35 | $(Sm_{0.71}Y_{0.29})_{7.5}(Fe_{0.70}Co_{0.30})_{88.9}Nb_{3.6}$ | 1.46 | 86.1 | 0.204 | 1.40 | 5.3 |
| Comp. Exam 1 | $(Sm_{0.68}Zr_{0.32})_{7.8}(Fe_{0.70}Co_{0.30})_{88.2}Ti_{4.0}$ | 1.48 | 86.5 | 0.242 | 1.40 | 5.5 |
| Comp. Exam 2 | $(Sm_{0.64}Zr_{0.36})_{7.7}(Fe_{0.69}Co_{0.31})_{88.4}Nb_{3.9}$ | 1.47 | 85.5 | 0.251 | 1.39 | 5.6 |
| Comp. Exam 3 | $(Sm_{0.10}Y_{0.90})_{7.5}(Fe_{0.70}Co_{0.30})_{88.5}Ti_{4.0}$ | 1.43 | 86.4 | 0.221 | 1.36 | 3.0 |
| Comp. Exam 4 | $(Sm_{0.12}Y_{0.88})_{7.5}(Fe_{0.70}Co_{0.30})_{88.9}Nb_{3.6}$ | 1.48 | 86.3 | 0.235 | 1.41 | 3.1 |
| Comp. Exam 5 | $(Sm_{0.9}Y_{0.1})_{7.8}(Fe_{0.25}Co_{0.75})_{89.3}Ti_{2.9}$ | 1.27 | 86.1 | 0.211 | 1.20 | 1.2 | the precipitation amount of the α-(Fe, Co) phase of the magnetic material in each of the comparative examples 1 to 4 is larger than the precipitation amount of the α-(Fe, Co) phase of the magnetic material in each of the examples 1 to 35.

Both of the values of the saturation magnetization and the values of the anisotropic magnetic field in the examples 1 to 35 and the comparative examples 1 to 5 is determined in accordance with magnetic field used for the evaluation thereof.

The above-described embodiments have been presented by way of example only, and are not intended to limit the scope of the inventions. Indeed, the novel embodiments described herein may be embodied in a variety of other forms; furthermore, various omissions, substitutions and changes may be made without departing from the spirit of the inventions. These embodiments and their modifications fall within the scope and spirit of the inventions and fall within the scope of the inventions described in claims and their equivalents.

What is claimed is:

1. A magnetic material expressed by a composition formula:

$$(R_{1-x}Y_x)_a M_b T_c A_d$$

where R is at least one element selected from the group consisting of rare-earth elements, T is at least one element selected from the group consisting of Ti, V, Nb, Ta, Mo, and W, M is Fe or Fe and Co, A is at least one element selected from the group consisting of N, C, B, H, and P, x is a number satisfying $0.01 \leq x \leq 0.8$, a is a number satisfying $4 \leq a \leq 20$ atomic percent, b is a number satisfying b=100−a−c−d atomic percent, c is a number satisfying $0 < c < 7$ atomic percent, and d is a number satisfying $0 \leq d \leq 18$ atomic percent,
the magnetic material comprising:
a main phase consisting of a ThMn$_{12}$ type crystal phase,
wherein 30 atomic percent or more of the element M in the composition formula is Fe.

2. The magnetic material according to claim 1,
wherein the d is a number satisfying d=0 atomic percent,
wherein 50 atomic percent or more of the element R in the composition formula is Sm.

3. The magnetic material according to claim 1,
wherein the d is a number satisfying $0 < d \leq 18$ atomic percent,
wherein 50 atomic percent or more of the element R in the composition formula is at least one element selected from the group consisting of Ce, Pr, Nd, Tb, and Dy.

4. The magnetic material according to claim 1,
wherein in an X-ray diffraction pattern of the magnetic material, a ratio of a maximum value of a second peak intensity corresponding to an α-(Fe, Co) phase to a sum of a maximum value of a first peak intensity corresponding to the ThMn$_{12}$ type crystal phase and the maximum value of the second peak is less than 0.20.

5. The magnetic material according to claim 1,
wherein 50 atomic percent or less of the element Y in the composition formula is replaced with at least one element selected from the group consisting of Zr and Hf.

6. The magnetic material according to claim 1,
wherein 50 atomic percent or more of the element T in the composition formula is Ti or Nb.

7. The magnetic material according to claim 1,
wherein 20 atomic percent or less of the element M in the composition formula is replaced with at least one element selected from the group consisting of Al, Si, Cr, Mn, Ni, Cu, and Ga.

8. The magnetic material according to claim 1,
wherein a concentration of the element M in the main phase is 87.4 atomic percent or more of a total amount of the element R, the element Y, the element M, and the element T in the main phase.

9. The magnetic material according to claim 1,
wherein the M in the composition formula is expressed by $Fe_{1-y}Co_y$,
wherein the y is a number satisfying $0.01 \leq y \leq 0.3$.

10. A permanent magnet comprising the magnetic material according to claim 1.

11. A permanent magnet comprising a sintered body of the magnetic material according to claim 1.

12. A rotary electrical machine, comprising:
a stator; and
a rotor,
wherein the stator or the rotor comprises the permanent magnet according to claim 11.

13. The rotary electrical machine according to claim 12,
wherein the rotor is connected to a turbine via a shaft.

14. A vehicle, comprising the rotary electrical machine according to claim 12.

15. The vehicle according to claim 14,
wherein:
the rotor is connected to a shaft; and
rotation is transmitted to the shaft.

* * * * *